United States Patent [19]

Eberhard

[11] Patent Number: 5,898,825
[45] Date of Patent: Apr. 27, 1999

[54] FAILED COMMAND TRANSLATION TECHNIQUE

[75] Inventor: Raymond James Eberhard, Endicott, N.Y.

[73] Assignee: International Business Machines Corporation, Armonk, N.Y.

[21] Appl. No.: 08/710,906

[22] Filed: Sep. 24, 1996

[51] Int. Cl.[6] ................................................. G06F 11/00
[52] U.S. Cl. ................................................. 395/181; 707/5
[58] Field of Search ........................ 364/226.4, 274, 364/274.2, 274.4, 274.5, 274.8; 395/12, 51, 40, 61, 181; 707/3, 4, 5, 6; 371/57.1

[56] References Cited

U.S. PATENT DOCUMENTS

| | | | |
|---|---|---|---|
| 4,859,091 | 8/1989 | Ueda | 400/63 |
| 5,025,385 | 6/1991 | Froyd | 364/474.11 |
| 5,239,617 | 8/1993 | Gardner et al. | 395/12 |
| 5,255,386 | 10/1993 | Prager | 395/600 |
| 5,369,575 | 11/1994 | Lamberti et al. | 364/419 |
| 5,377,103 | 12/1994 | Lamberti et al. | 364/419 |
| 5,729,744 | 3/1998 | Gerken et al. | 707/3 |

*Primary Examiner*—Trinh L. Tu
*Attorney, Agent, or Firm*—Douglas M. Clarkson

[57] ABSTRACT

A technique involves trapping a command-not-found message instead of displaying it when an erronous command is entered at a user terminal and connecting it to a translation file of successful command signals which is searched for a match. There are several alternatives including displaying a failing command signal for editing, verification, review or confirmation. If a match is revealed, a substitute command signal can be displayed also for these activities.

15 Claims, 4 Drawing Sheets

FAILED COMMAND TRANSLATION TECHNIQUE

BACKGROUND OF THE INVENTION

1. Field of the Invention

The present invention, generally, relates to systems that require the use of user-entered commands and, more particularly, to a technique for detecting an incorrect command entered by a user but executing a correct command.

An individual using a computer can easily enter an incorrect command, and this might even be done deliberately when the correct command does not quickly come to mind. While several on-line help systems are available for this type of situation, they require a deviation from the more comfortable routine of just entering commands.

2. Related Prior Art

U.S. Pat. No. 5,255,386 to Prager describes a system based on a list of intents for commands, and when an error in a command is detected but the intent is available, a command that compares with the intent is suggested to the user.

U.S. Pat. No. 5,239,617 to Gardner et al. describes a system that provides suggestions in response to an erroneous command entered by a user, and this system includes a language analyzer for providing a way to achieve a goal.

U.S. Pat. No. 4,859,091 to Ueda describes a word processor that develops spelling corrections in response to incorrectly spelled words entered in a sentence.

U.S. Pat. No. 5,369,575 to Lamberti et al. describes an interface between a user's input and a prestored goal and performs the action when a match is found.

OBJECTS AND SUMMARY OF THE INVENTION

It is a principal object of the present invention to provide a technique for trapping a command-not-found message when an erroneous command is entered in a command processor apparatus and updating a translation file when the user accepts a translation that is presented.

It is also an object of the present invention to provide a technique for determining a correct command when an erroneous command is entered and selectively updating a command translation file.

Another object of the present invention is to provide a technique for use with command processors to maintain a translation file of improper/proper commands in order to execute a proper command selectively when a match is determined with an improper command.

A further object of the invention is to provide a technique for updating a translation file used with a command processor when a user accepts a determined command that is responsive to an entered command.

Briefly, a technique in accordance with the present invention traps a command-not-found message that usually is displayed when an erroneous command has been entered, and a file containing a list of such commands is searched. If a match is found, the correct command is entered, or alternatively, the correct command is displayed to the user for confirmation. When no match is found, the technique of the invention includes a translation capability to display a command with a request for confirmation. After a determined command is answered in the affirmative, the translation file can be updated for future use.

DETAILED DESCRIPTION OF THE INVENTION

Before describing the invention involving the figures of the drawings, a brief overview of the invention is as follows.

A purpose that the present invention can perform is to function as a command translation system to translate a failing, user-entered command into a potentially successful command. In other words, when a command fails to execute, a special code is passed to the system of the invention.

Upon receipt of this code, a translation file is searched to locate information corresponding to the failing, user-entered command. If this comparison search is successful, a command that has been stored can be entered as a substitute command.

However, the user can select one of two modes for controlling the execution of the substitute command. One mode may be selected under which a substitute command is executed immediately following its identification in the command translation step.

A second mode can be selected, according to the invention, under which a substitute command is displayed at the user's terminal, and the user can confirm it, or alternatively, the user can edit it, before the substitute command is passed to the operating system for execution. The mode selected, whether mode one or mode two, is determined, according to a presently preferred form of the invention, at the time that the user's terminal is initialized.

If a failing, user entered command does not match any command already stored in the command translation file, a message is passed to the user's terminal that indicates this failure. At this point, a successful command must be created, and when this is entered, it is stored in the command translation file where it will be entered as a match for the failing, user entered command in the future.

Figure 1:
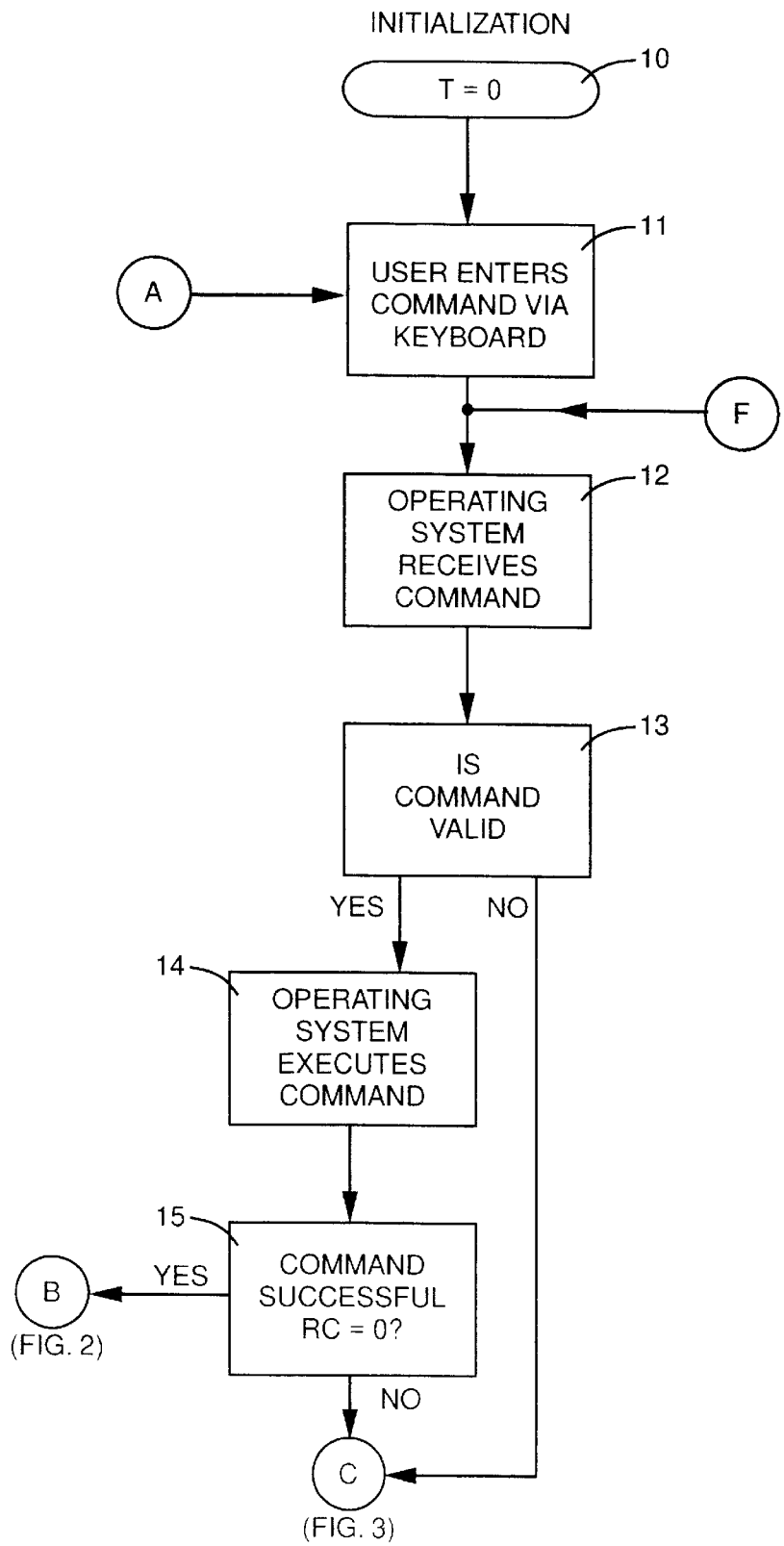
FIG. 1 through FIG. 5 are one continuous Flow Chart illustrating the respective steps involved in the present invention as an aid for the description to follow.

Referring now to the drawings, more particularly, to FIG. 1, the initialization of a user's terminal is indicated by step 10. It is at this point that the operating program state variable T is initialized to zero.

A user enters a command via a keyboard at the user's terminal, indicated by the letter A and, also, as step 11. This user-entered command is connected to an operating system, step 12, where it will be determined whether it is a valid, recognized command, step 13.

Figure 2:
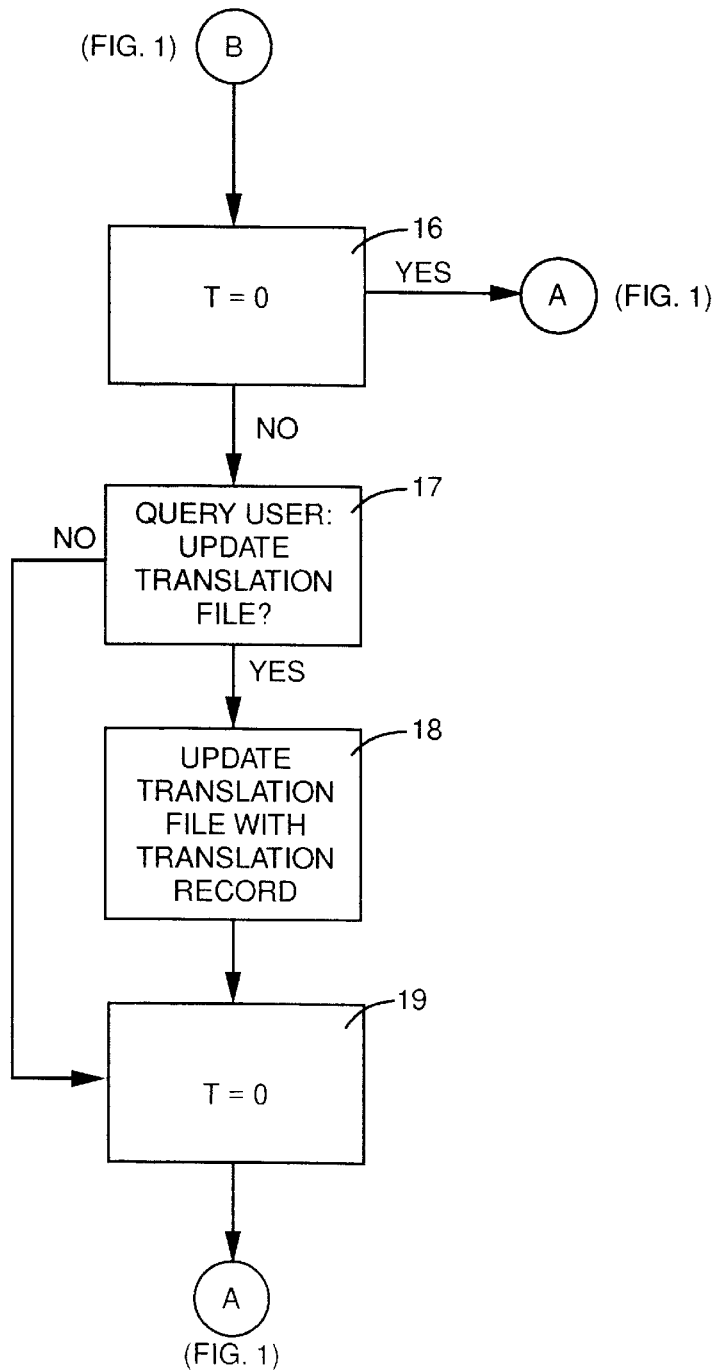

If the command is recognized as a valid command, the operating system executes the command, step 14, and if the operating system operates successfully, control continues, step 15, and to point B, from FIG. 1 on to FIG. 2.

Referring next to FIG. 2, the state of the code T is tested, step 16, and if it equals zero, an update of the command translation file is not required, since the command was executed successfully. Therefore, control passes to point A, and back to FIG. 1.

However, if the state of the code T is a one, a previously executed command was not completed successfully, but it may be associated with a currently entered command that did complete successfully. When this is the case, a query is posted to the user's terminal asking whether the previously unsuccessful command should be associated with the current command, shown in FIG. 2 as step 17.

If the user answers yes, the command translation file is updated, step 18, with a record indicating that the two commands are associated. In accordance with the invention, this association is used to replace the failing command with the successful command if it is ever entered in the future by the user.

Once the command translation file is updated, or when the user answers no to the query regarding the above-described command association, the operating program state variable T is set to zero, step 19, and control returns to point A, FIG. 1.

Figure 3:
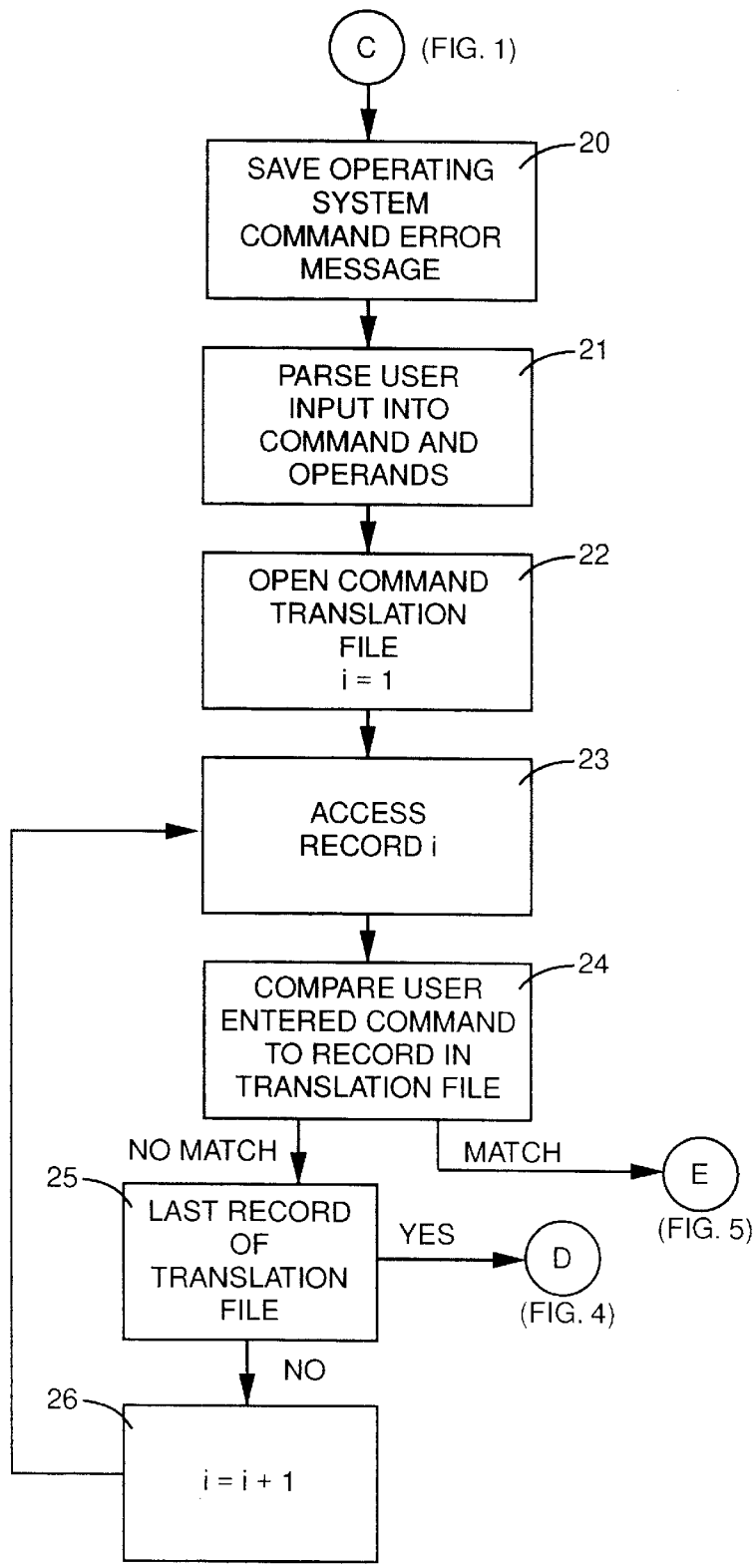

Returning now to FIG. 1, when it is determined that the command is not a valid, recognized command, or if the command did not execute successfully, step 13, a non-zero return code is set (such as a one, for example) and control passes to point C and to step 20 in FIG. 3.

In FIG. 3, step 20 indicates that whenever a command is entered that results in a non-zero return code, the usual display of a command failure message is inhibited. Typically, these messages are displayed, in the absence of the present invention, whenever a user-entered command cannot be executed successfully.

Now, in accordance with the invention, any failing command is parsed, step 21, into its corresponding arguments, and the command translation file is accessed, step 22. A record, i, step 23, from the command translation file is read and compared with the failing command, step 24. This reading and comparing continues, and when a match is found, the program control continues at point E, FIG. 5.

Figures 4, 5:
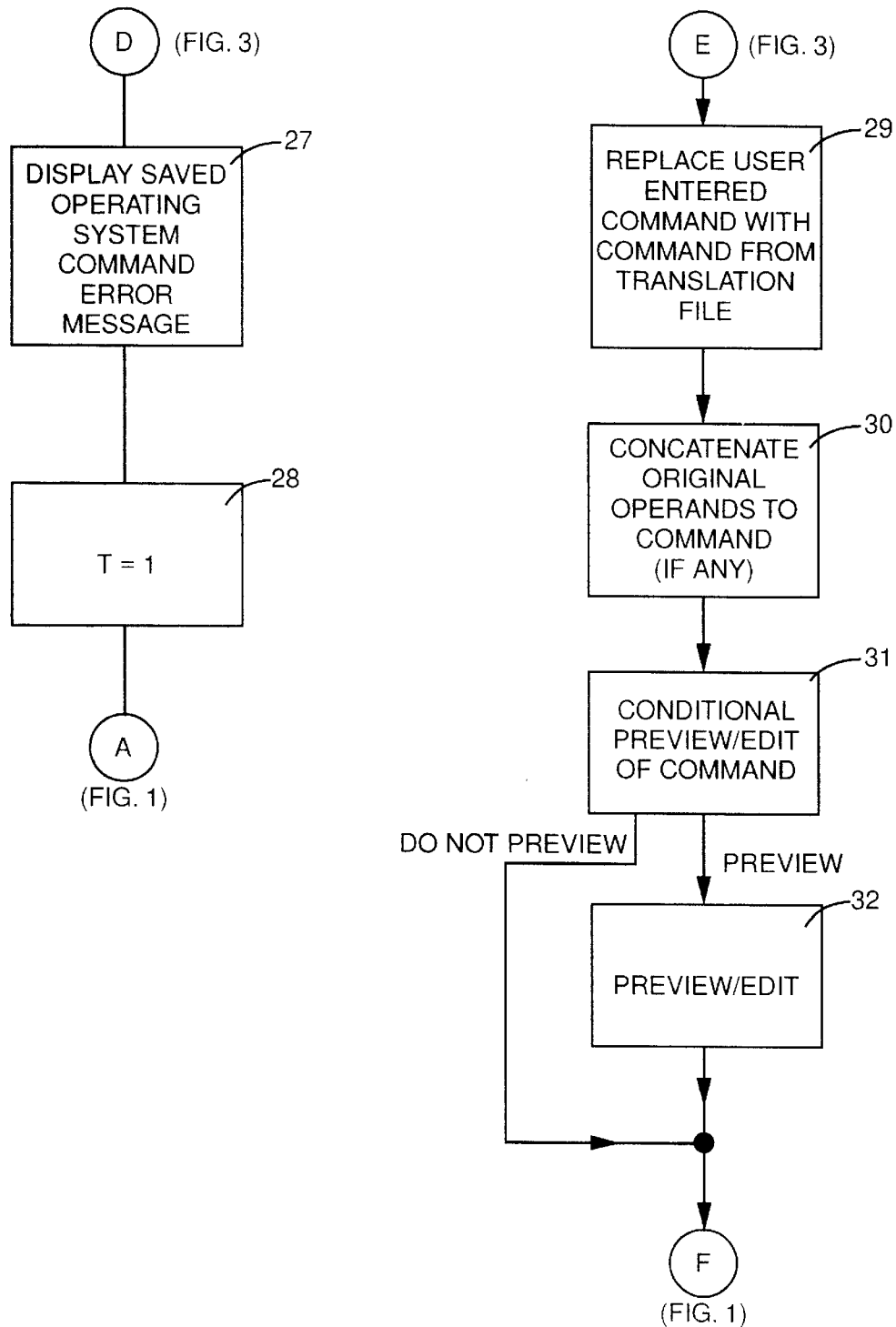

If a match is not found, meaning that the failing command doe; not compare successfully with any record that is read in the file, and the end of the command translation file is reached, step 25, the program control continues at point D, FIG. 4.

In FIG. 4 of the drawings, the point D is reached when a match for the failing command cannot be found in the translation file, so now, a previously saved message that indicated command failure is displayed at the user's terminal, step 27. Now, the state variable is set to one, step 28, to indicate that the previously entered command failed to execute.

The setting of the state variable to one also indicates that the next successfully executed command might be associated with the failing command. Therefore, the program control continues to point A of the flow chart, FIG. 1.

In FIG. 5 of the drawings, point E is reached to indicate that a match was found in the translation file for the non-successful command and that the non-successful command has been translated into a substitute command that might be successfully executed. Of course, this can depend on other factors in the computer system, but it will be attempted, indicated by step 29.

Step 30 describes an alternate implementation whereby a portion of the failing command is corrected.

However, if the substitute command is tried but is unsuccessful, i.e., its attempted execution returns a one (or a non-zero) return code, the command translation file will be accessed repeatedly until a successful command is translated, or until the end of the translation file is reached.

FIG. 5 also illustrates an alternate mode by which the technique of the invention may function, i.e., the substitute command that the translation file develops is displayed to the user's terminal. Now, the user may choose, step 31, to review the translated command or not to review it.

If a review be selected, the program control passes to step 32, where the failed command is previewed and possibly edited. The result produced is passed to point F in FIG. 1 of the drawings.

If a Do Not Review is selected, this decision by the user is passed immediately to point F in FIG. 1. Therefore, in accordance with the present invention, regardless of whether or not the command is edited by the user, program control continues to point F once the user enters the command.

While the invention has been described in substantial detail with what is presently considered to be the most practical and the presently preferred embodiment, it is to be understood that the invention is not limited by the embodiment described, but rather, the invention is intended to include various modifications and the various equivalents that are covered by the spirit and scope of the appended claims. Therefore, it is understood that all such changes, modifications, alterations and equivalents are included within the scope of the following claims.

What is claimed is:

1. A method of operating a communication center that is responsive to commands entered at a user terminal, comprising:

intercepting a command signal entered at said user terminal which fails in achieving a predetermined execution result;

connecting said failing command signal to a translation file containing predetermined command signals that would achieve said predetermined execution result;

comparing said failing command signal with said predetermined command signals contained in said translation file for obtaining a predetermined match with a command signal that would achieve said predetermined execution result;

entering a predetermined command signal that matches said failing command signal as a substitute command signal for achieving said predetermined execution result; and maintaining said translation file by updating said command signals as relating to said predetermined execution result contained by said translation file.

2. A method as defined by claim 1 including the step of connecting said substitute command signal to said user terminal for verification prior to entering.

3. A method as defined by claim 1 including the step of storing in said translation file predetermined information relating failing command signals to successful command signals for use by said translation file in determining a match.

4. A method as defined by claim 1 including the steps of storing in said translation file predetermined information relating failing command signals to successful command signals, and searching said predetermined information stored in said translation file in determining a match.

5. A method as defined by claim 1 including the steps of connecting a predetermined command signal to said user terminal prior to connecting it to said translation file, and providing an opportunity for review of said predetermined command signal.

6. A method as defined by claim 1 including the steps of connecting a predetermined command signal to said user terminal prior to connecting it to said translation file, and providing an opportunity for editing said predetermined command signal.

7. A method as defined by claim 1 including the steps of updating correspondence information stored in said translation file with information relating failing command signals to successful command signals, and providing said user terminal with an opportunity to review, accept or deny said information to be stored.

8. A method as defined by claim 1 including the steps of connecting said substitute command signal to said user terminal for verification and review prior to entering.

9. A method as defined by claim 1 including the steps of connecting said substitute command signal to said user terminal prior to entering for providing an opportunity for review.

10. A method as defined by claim 1 including the steps of storing in said translation file predetermined information relating failing command signals to successful command signals, searching said predetermined information for a substitute command signal matching said failing command signal, and connecting said substitute command signal to said user terminal for providing an opportunity for review prior to entering.

11. A method for operating data responsive apparatus, comprising the steps of:

entering a command signal at a user terminal for obtaining a predetermined execution result;

intercepting a command-not-found error signal message when said command signal fails to obtain said predetermined execution result; and determining what said command signal entered at said users terminal should have been to be a successful command signal for obtaining said predetermined execution result by connecting said error signal to a translation file that contains predetermined error signals matched with execution results that are predetermined to be successful.

12. A method as defined by claim 11 including the step of connecting a command signal to said users terminal that is determined to be said successful command signal for providing an opportunity for acceptance.

13. A method as defined by claim 11 wherein said determining step includes searching said translation file for said successful command signal.

14. A method as defined by claim 11 wherein said determining step includes the step of searching said translation file for said successful command signal, and updating said translation file by storing predetermined information relating said successful command signal to said failing command signal.

15. A method as defined by claim 11 including the steps of displaying said successful command signal at said users terminal for acceptance, and for providing an opportunity for review and editing, and for updating said translation file.

* * * * *